No. 670,797. Patented Mar. 26, 1901.
J. W. LYONS.
FASTENER FOR DOORS OR WINDOW SCREENS.
(Application filed May 19, 1900.)
(No Model.) 2 Sheets—Sheet 2.
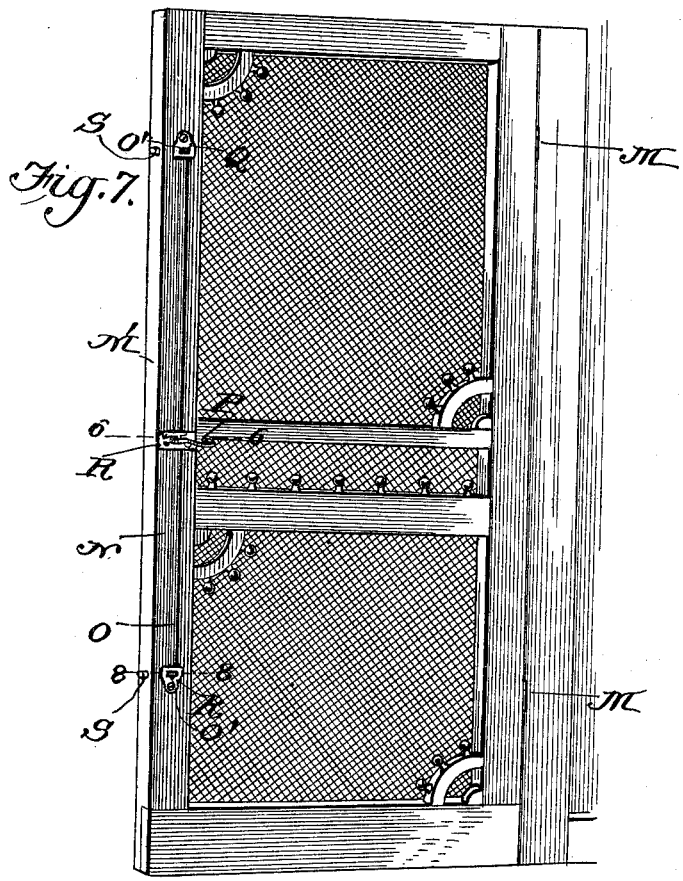
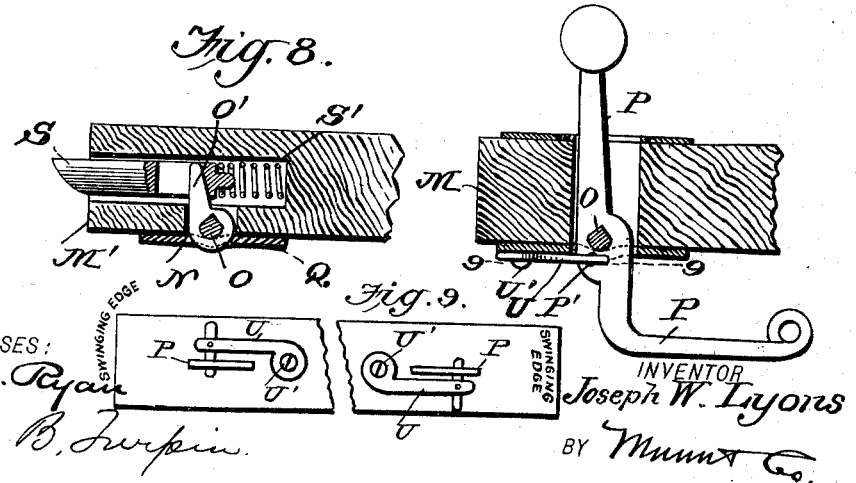
INVENTOR
Joseph W. Lyons
ATTORNEYS

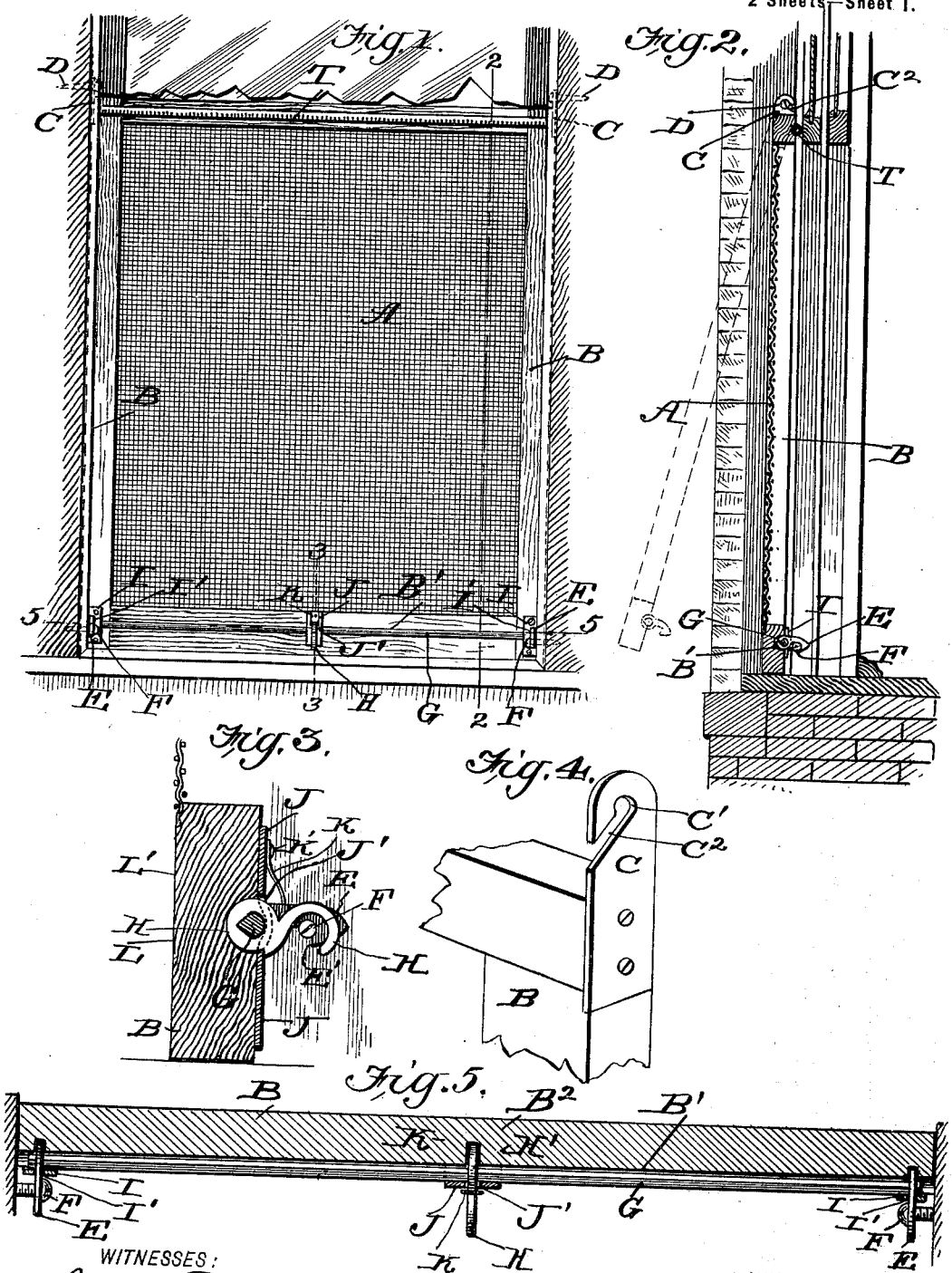

UNITED STATES PATENT OFFICE.

JOSEPH WARRINGTON LYONS, OF PUEBLO, COLORADO.

FASTENER FOR DOORS OR WINDOW-SCREENS.

SPECIFICATION forming part of Letters Patent No. 670,797, dated March 26, 1901.

Application filed May 19, 1900. Serial No. 17,256. (No model.)

*To all whom it may concern:*

Be it known that I, JOSEPH WARRINGTON LYONS, residing Pueblo, in the county of Pueblo and State of Colorado, have made certain new and useful Improvements in Double Fasteners for Doors or Window-Screens, of which the following is a specification.

My invention is an improvement in doors and window-screens, and relates particularly to the means for securing the same in place in such manner as to retain the same firmly in position and to prevent the warping thereof; and the invention consists in certain novel constructions and combinations of parts, as will be hereinafter described and claimed.

In the drawings, Figure 1 is a face view, and Fig. 2 a sectional view on about line 2 2 of Fig. 1, of my invention embodied in a window-screen. Fig. 3 is a detail vertical cross-section on about line 3 3 of Fig. 1. Fig. 4 is a detail perspective view of one of the upper corners of the screen-frame shown in Figs. 1 and 2. Fig. 5 is a cross-sectional view on about line 5 5 of Fig. 1. Fig. 6 is a cross-section on about line 6 6 of Fig. 7. Fig. 7 is a perspective view of a door embodying my invention. Fig. 8 is a detail section on about line 8 8 of Fig. 7, and Fig. 9 is a cross-sectional view on about line 9 9 of Fig. 6.

My invention is shown in Figs. 1 and 2 embodied in a fly-screen for a window, while in in Fig. 7 I illustrate the invention applied to a screen-door, the construction shown in Fig. 7 differing somewhat in details from that shown in Figs. 1 and 2, as will be pointed out; but in both forms the screen is hinged at one edge and is provided at its other edge with a longitudinally-extended shaft held to the frame and provided at or near its opposite ends with fastening means for securing the screen-frame closed, such shaft operating to prevent the frame from warping, and thus increasing its efficiency.

Referring now to the construction shown in Figs. 1 and 2, the screen A has its frame B provided at one edge with the hooks C, having the seats C' to engage with the studs D in the window-frame and having an inclined slot or passage C² leading to the seat C', so the frame may be hooked over the studs D and will engage therewith when moved inwardly and downwardly thereon, as will be understood from Figs. 2 and 4. Also when engaged with the studs, as shown in Fig. 2, the frame may be swung outwardly at its lower edge, as indicated in dotted lines, Fig. 2, the frame B being practically hinged at its upper edge, as shown. At its lower edge the frame B is secured by the catches E engaging studs F or other suitable seats in or upon the window-frame. These catches E are carried by the shaft G, which is non-circular in cross-section, as best shown in Fig. 3, so the catches E and the operating-lever H may be slipped longitudinally along the shaft G to any desired position. By this construction the shaft may be made of any suitable length and then cut to any desired length and the catches and levers be adjusted thereon to the desired positions. In securing the shaft G, I prefer to form the frame with a longitudinal groove or recess B', in which the shaft fits and turns, and upon the frame over the said groove B', I secure plates I, which operate to retain the shaft G in place and also form bearings for the shaft, being preferably rounded outwardly, as indicated in Fig. 3, to better receive the shaft. These plates I at the end of the shaft and the plate J at the center thereof are slotted at I' and J' for the passage of the catches E and the lever H, as shown in Fig. 5. The catches E are hooked at E' to engage the studs F, and they are held in engagement with said studs by means of the spring K, which is shown in Fig. 3 in the form of a plate-spring secured at one end K' to the plate J and bearing at its free end against the lever H, thus serving to press the catches E into engagement with the studs F.

In the operation of the construction before described the spring K, bearing against the lever H, operates to rock the shaft G and throw the hooks E' into engagement with the studs F. To release the catches E, it is only necessary to lift the lever H sufficiently high to adjust the catches E off the studs F, when the screen may be swung open, as indicated in dotted lines, Fig. 2. It will of course be understood that the catches E and the lever H are arranged on the inner side of the screen, so the latter can be manipulated from within the room.

In the construction shown in Fig. 7 the improvement is embodied in a door which is hinged at M and bears the fastening devices at its swinging edge M'. In this construction the door is grooved at N to receive the shaft O, which has the lever P, by which it may be operated, said shaft being secured in place by the plates Q and R, as shown. This shaft supports the inwardly-projecting crank-arms O', which operate the sliding bolts S, which are actuated by springs S', as shown in detail in Fig. 8. As will be understood from Figs. 6 and 8, the lever P may be conveniently operated to rock the shaft O and cause its crank-arms O' to force their bolts inwardly to release the door, which in this construction constitutes the screen-frame.

Manifestly in the construction shown in Fig. 7 the shaft O will, like the shaft G in the construction shown in Figs. 1 and 6, operate to prevent the warping of the door or other frame, and thus preserve the frame in the desired form.

In Figs. 1 and 2 I show a rubber or other suitable packing-strip T secured to the inner side of the top bar of the screen-frame and adapted to bear against the lower bar of the window-sash when the latter is raised.

The shafts G and O may be fitted on the surface of their frames instead of in the grooves in cheap constructions.

In Figs. 6 and 9 I illustrate a lock consisting of a latch U, pivoted at U' and having a pin U² to enter an opening P' in the lever P when it is desired to lock the lever. The lock may be adjusted at either side of the lever, as will be understood from full lines, Fig. 9, and full and dotted lines, Fig. 6.

Having thus described my invention, what I claim as new, and desire to secure by Letters Patent, is—

1. A frame substantially as described having a hinge connection at one edge and provided at its opposite edge in its face with an open longitudinally-extended recess or groove and with fastening devices including catches and a shaft for operating the same, said shaft being provided with means by which it may be operated and being fitted in the recess or groove of the frame, plates held to the frame overlying the said groove and shaft and securing the shaft in the groove or recess of the frame and forming bearings for the shaft, and spring devices substantially as set forth.

2. In a device substantially as described, the frame having an open longitudinal groove or recess, a shaft fitted therein and provided with catches and with an operating-lever, a spring operating upon the lever to actuate the shaft, and plates having slots for the lever and catches and fitted thereover and over the groove or recess and secured to the frame substantially as set forth.

3. A frame having a shaft held thereto and provided at or near its ends with catches including sliding spring-actuated bolts and arms on the shaft engaged therewith, and means for operating the shaft substantially as set forth.

4. The frame provided at one end with the plates C having seat C' and downwardly-opening slots C² leading thereto and having at its other end the spring-actuated shaft provided between its ends with an operating-lever and at its opposite ends with fastening means substantially as set forth.

In testimony whereof I have signed my name to this specification in the presence of two subscribing witnesses.

JOSEPH WARRINGTON LYONS.

Witnesses:
CHAS. M. ROBERTS,
WM. G. MAXWELL.